US 8,248,490 B2

(12) United States Patent
Zhang et al.

(10) Patent No.: US 8,248,490 B2
(45) Date of Patent: Aug. 21, 2012

(54) IMAGING SENSOR HAVING REDUCED COLUMN FIXED PATTERN NOISE (75) Inventors: Guangbin Zhang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 280 days.

(21) Appl. No.: 12/764,846

(22) Filed: Apr. 21, 2010

(65) Prior Publication Data

US 2011/0261233 A1 Oct. 27, 2011

(51) Int. Cl.
*H04N 5/217* (2011.01)

(52) U.S. Cl. ............. 348/241; 348/230.1; 348/320; 348/321; 348/322

(58) Field of Classification Search ......... 348/230.1, 348/320–322
See application file for complete search history.

(56) References Cited

U.S. PATENT DOCUMENTS

| 6,844,896 | B2 | 1/2005 | Henderson et al. | |
|---|---|---|---|---|
| 7,084,912 | B2 * | 8/2006 | Chieh | 348/245 |
| 7,995,124 | B2 * | 8/2011 | Dai | 348/300 |
| 2002/0051067 | A1 * | 5/2002 | Henderson et al. | 348/241 |
| 2003/0183850 | A1 * | 10/2003 | Pain et al. | 257/200 |
| 2005/0231732 | A1 * | 10/2005 | Monshouwer et al. | 356/508 |
| 2006/0231732 | A1 * | 10/2006 | Yan | 250/208.1 |
| 2009/0040351 | A1 * | 2/2009 | Cho | 348/308 |

FOREIGN PATENT DOCUMENTS

WO   WO 2009/093725 A1   7/2009

OTHER PUBLICATIONS

Snoeij, M. et al., "A CMOS Imager With Column-Level ADC Using Dynamic Column Fixed-Pattern Noise Reduction," IEEE Journal of Solid-State Circuits, Dec. 2006, pp. 3007-3015, vol. 41, No. 12, (9 pages).
Snoeij, M. et al., "A CMOS Imager With Column-Level ADC Using Dynamic Column FPN Reduction," IEEE International Solid-State Circuits Conference, ISSCC 2006, Session 27, Image Sensors 27.4, (10 pages).
EP 10 25 1165—European Search Report and Written Opinion dated Nov. 23, 2010. (7 pages).

* cited by examiner

*Primary Examiner* — Timothy J Henn
*Assistant Examiner* — Abdelaaziz Tissire
(74) *Attorney, Agent, or Firm* — Blakely Sokoloff Taylor & Zafman LLP (57) ABSTRACT

An imaging sensor having reduced column fixed pattern noise includes a plurality of imaging pixels and a column sampling circuit. The plurality of imaging pixels are arranged in a column the column sampling circuit is coupled to the column. A plurality of sampling channels are included in the column sampling circuit, where the column sampling circuit randomly selects a first sampling channel from among the plurality of sampling channels to sample a first data signal from a pixel included in the plurality of imaging pixels and where the column sampling circuit randomly selects a second sampling channel from among the plurality of sampling channels to sample a second data signal from the pixel.

13 Claims, 8 Drawing Sheets

IMAGING SENSOR HAVING REDUCED COLUMN FIXED PATTERN NOISE

TECHNICAL FIELD

This disclosure relates generally to imaging sensors and in particular but not exclusively, relates to imaging sensors with column readout circuitry.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal oxide semiconductor (CMOS) image sensors, has continued to advance at great pace. For example, the demands of higher resolution, higher quality images and lower power consumption have encouraged the further miniaturization and integration of these image sensors. However, column fixed pattern noise (FPN) is a known issue for CMOS image sensors. FPN is the spatial variation in pixel outputs under uniform illumination due to device and interconnect mismatches over the sensor. FPN may present itself in a resultant image as the same pattern of brighter or dimmer pixels occurring with images taken under the same conditions of temperature and exposure.

Various sampling methods may be used to reduce column FPN. For example, one method (e.g., correlated double sampling) may include resetting a pixel of the CMOS image sensor to a reference value, then sampling the reference value at the pixel (e.g., black level signal). During an actual image acquisition, the pixel is exposed to light and charged to produce a light signal (e.g., light level signal). This light signal is then compared to the sampled reference value (e.g., black level signal is subtracted from the light level signal) to arrive at a final value (e.g., the resultant image). This process is an attempt to eliminate noise from the final value and hence, the resultant image. However, conventional image sensors introduce a new offset noise due to the mismatch between individual components involved in sampling light and black level signals. In other words, the final value will be the light level signal minus the black level signal plus the offset noise. Typically, each pixel in a particular column will have the same offset because each column includes its own column sampling circuit. Pixels in another column will have another offset value. Accordingly, vertical lines forming column FPN will appear on the screen, when a detected image is displayed. Each vertical line represents a column in an imaging sensor and has a width corresponding to one pixel. The brightness of the line corresponds to the offset value of that particular column.

Furthermore, for example, one method (e.g., delta double sampling) may include the detection of the offset value of each column, then the detected offset value is deducted from the final value of pixels at that particular column. In this way, the final value can ideally be derived to have column FPN reduced. However, methods such as this involve signal subtractions, which may not have 100% accuracy because of non-linearity and variation of column sampling circuits. As a result, there is normally still a small portion of column FPN left (i.e., residual column FPN) even after methods such as correlated double sampling and/or delta-double sampling methods are applied.

In some instances a high signal gain is applied to the CMOS image sensor to "boost" an image during low lighting conditions. In these cases, the residual column FPN may become even more visible. Additionally, in mass-production of CMOS image sensors, fabrication process variations may make the column FPN worse for some chips. Furthermore, when running the sensor in bad conditions, such as very high or very low temperature, with a low supply voltage, and/or with a noisy power supply, the column FPN may become even worse. Thus, the resultant column FPN in image may be an obvious artifact that is very unpleasant to the human eye and may limit the yield of CMOS image sensors in mass-production.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an imaging sensor having reduced column fixed pattern noise are described herein. The readout of a pixel in a column of a conventional imaging sensor typically contains a constant offset for all pixels in the column. Various constant offsets of different columns will produce visible vertical lines in the resultant image. Embodiments of the image sensor disclosed herein randomizes the sign of the offset when a pixel in a column is readout. Thus some pixel readouts will contain a positive offset and some other readouts will contain a negative offset, which are selected randomly. As a result the visible vertical lines in the resultant image become less visible or invisible.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
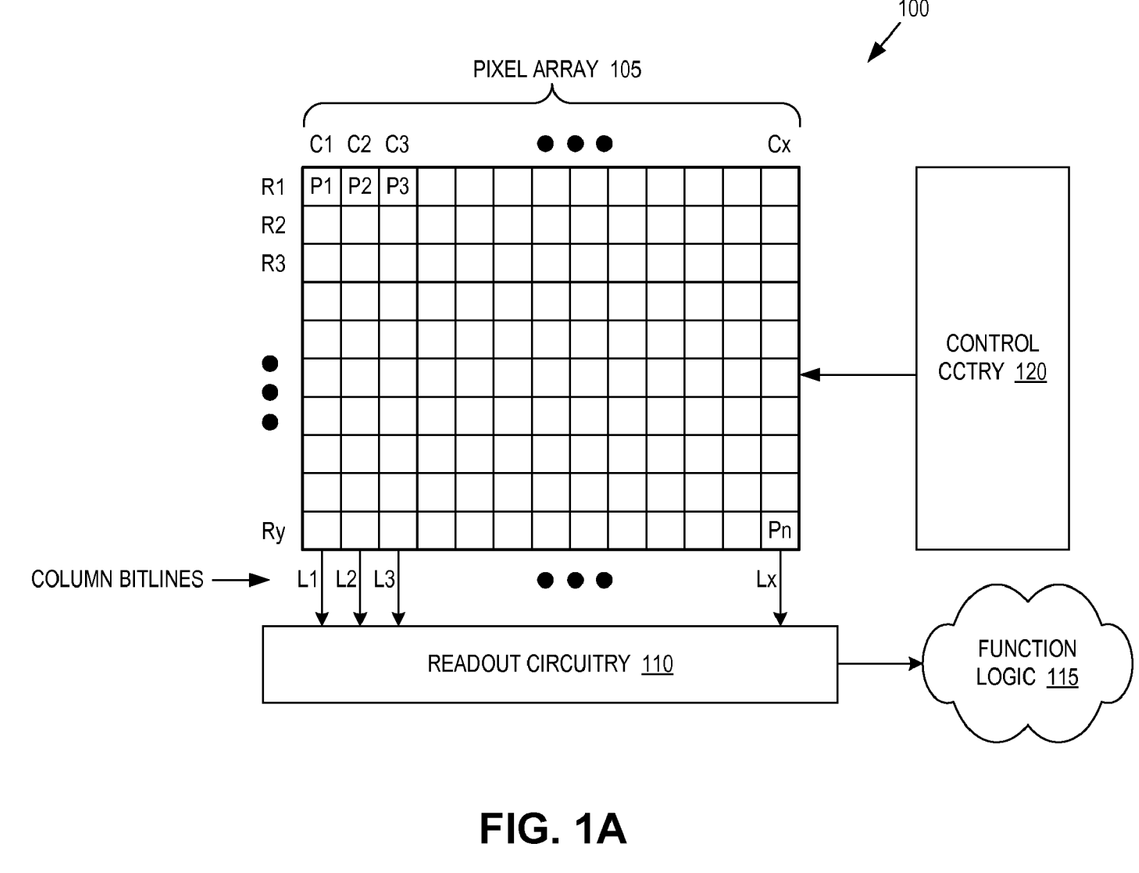
FIG. 1A is a functional block diagram illustrating an imaging sensor with channel randomization, in accordance with an embodiment of the invention.

FIG. 1A is a functional block diagram illustrating an imaging sensor 100 with sampling channel randomization, in accordance with an embodiment of the invention. The illustrated embodiment of imaging sensor 100 includes a pixel array 105, readout circuitry 110, function logic 115, and control circuitry 120.

Pixel array 105 is a two-dimensional ("2D") array of imaging pixels (e.g., pixels P1, P2 . . . , Pn). In one embodiment, each pixel is an imaging pixel of an active pixel sensor ("APS"), such as a complementary metal-oxide-semiconductor ("CMOS") imaging sensor. As illustrated, each pixel is arranged into a row (e.g., rows R1 to Ry) and a column (e.g., column C1 to Cx) to acquire image data of a person, place, or object, which can then be used to render a 2D image of the person, place, or object.

After each pixel has acquired its image data or image charge, the image data is readout by readout circuitry 110 and transferred to function logic 115. Readout circuitry 110 may include sampling channel randomization circuitry (discussed below), amplification circuitry, analog-to-digital conversion circuitry, or otherwise. Function logic 115 stores the image data or even manipulates the image data by applying post image effects (e.g., crop, rotate, remove red eye, adjust brightness, adjust contrast, or otherwise). In one embodiment, readout circuitry 110 may readout a row of image data at a time along readout column lines (illustrated) or may readout the image data using a variety of other techniques (not illustrated).

Control circuitry 120 is coupled to pixel array 105 to control operational characteristic of pixel array 105. For example, control circuitry 120 may generate a shutter signal for controlling image acquisition.

Figure 1B:
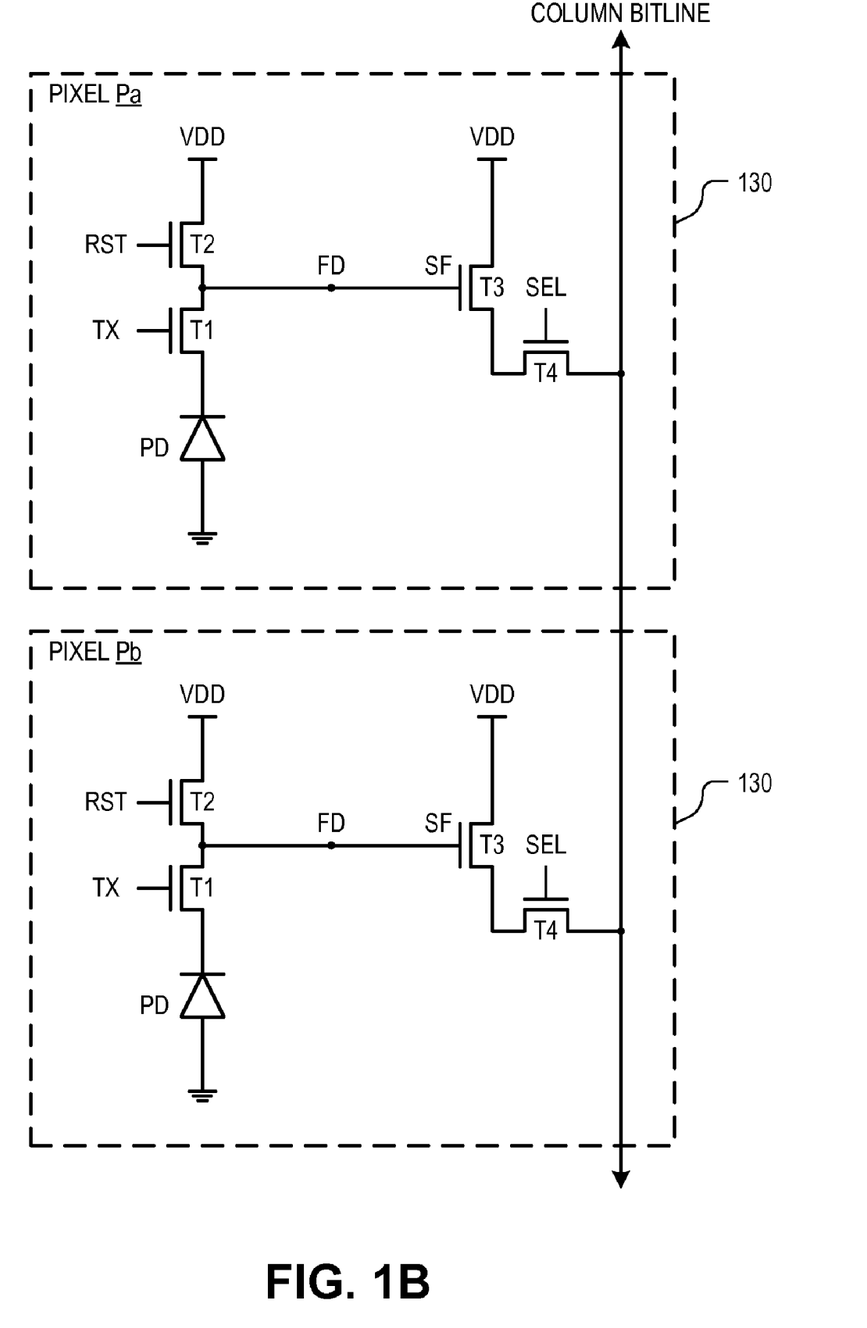
FIG. 1B is a circuit diagram illustrating pixel circuitry of two four-transistor ("4T") pixels within an imaging pixel array, in accordance with an embodiment of the invention.

FIG. 1B is a circuit diagram illustrating pixel circuitry 130 of two four-transistor ("4T") pixels within an imaging pixel array, in accordance with an embodiment of the invention. Pixel circuitry 130 is one possible pixel circuitry architecture for implementing each pixel within pixel array 100 of FIG. 1. However, it should be appreciated that embodiments of the present invention are not limited to 4T pixel architectures; rather, one of ordinary skill in the art having the benefit of the instant disclosure will understand that the present teachings are also applicable to 3T designs, 5T designs, and various other pixel circuitry architectures.

In FIG. 1B, pixels Pa and Pb are arranged in two rows and one column. The illustrated embodiment of each pixel circuitry 130 includes a photodiode PD, a transfer transistor T1, a reset transistor T2, a source-follower ("SF") transistor T3, and a select transistor T4. During operation, transfer transistor T1 receives a transfer signal TX, which transfers the charge accumulated in photodiode PD (e.g., light level signal) to a floating diffusion node FD.

Reset transistor T2 is coupled between a power rail VDD and the floating diffusion node FD to reset by discharging or charging the FD to a preset voltage (e.g., black level signal) under control of a reset signal RST. The floating diffusion node FD is coupled to the gate of SF transistor T3. SF transistor T3 is coupled between the power rail VDD and select transistor T4. SF transistor T3 operates as a source-follower providing a high impedance output from floating diffusion node FD (e.g., buffering light or black level signal). Finally, select transistor T4 selectively couples the output of pixel circuitry 130 to the column bitline under control of a select signal SEL (e.g., reading light or black level signal). In one embodiment, the TX signal, the RST signal, and the SEL signal are generated by control circuitry 120.

Figure 2:
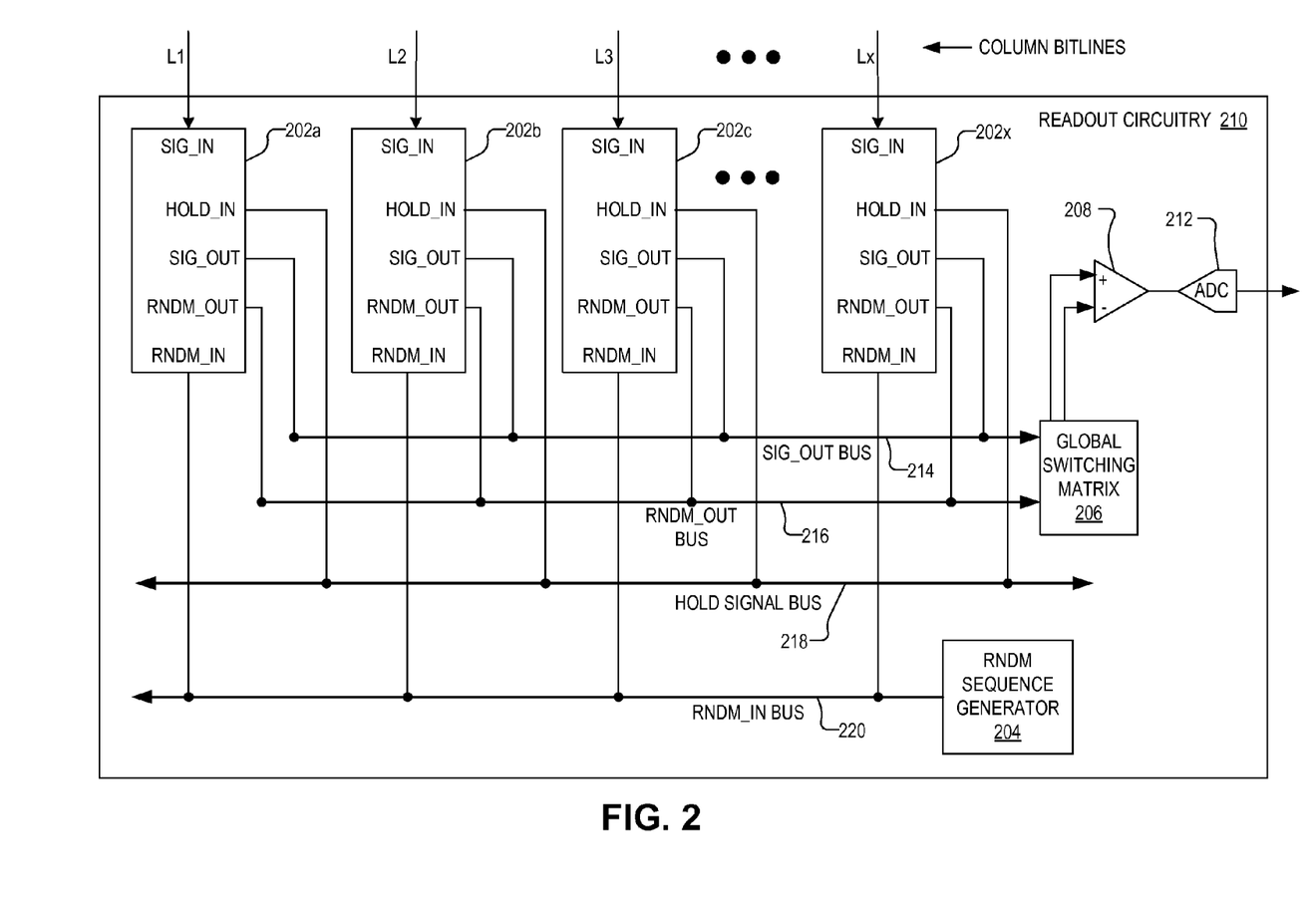
FIG. 2 is a functional block diagram illustrating readout circuitry of an imaging sensor with channel randomization, in accordance with an embodiment of the invention.

FIG. 2 is a functional block diagram illustrating readout circuitry 210 of an imaging sensor with sampling channel randomization, in accordance with an embodiment of the invention. Readout circuitry 210 is one possible implementation of readout circuitry 110 of FIG. 1A. The illustrated embodiment of readout circuitry 210 includes column sampling circuits 202a-202x, a random bit sequence generator 204, a global switching matrix 206, a global gain stage 208, an analog-to-digital converter (ADC) 212, a signal output bus 214, a random output bus 216, a hold signal bus 218 and a random input bus 220.

In the illustrated embodiment of FIG. 2, each of the column sampling circuits 202a-202x are coupled to a single column bitline. For example, column sampling circuit 202a is coupled to column bitline L1, column sampling circuit 202b is coupled to column bitline L2, and column sampling circuit 202c is coupled to column bitline L3, etc. A column sampling circuit is coupled to a respective column of the imaging sensor. Furthermore, column sampling circuits 202a-202x each include an input SIG_IN coupled to receive data signals from imaging pixels included in their respective columns. Thus, in one embodiment, data signals from all imaging pixels included in a particular column are received by a respective column readout circuit. In one embodiment, the data signals from a pixel include a black level signal (also referred to as reference value signal) and a light level signal.

Column sampling circuits 202a-202x each include an output SIG_OUT coupled to output the data signals to the signal output bus (i.e., SIG_OUT BUS) 214. The output SIG_OUT and signal output bus 214 may include a plurality of channels for sampling the data signals. For example, signal output bus 214 may include two or more lines for transmitting the data signals (e.g., at least one line for transmitting a black level signal and at least one line for transmitting a light level signal). Embodiments of the present invention include randomly selecting from among these pluralities of channels for transmitting and sampling the data signals. That is, one channel may be used to sample a black level signal during readout of a particular imaging pixel, while the same channel may be used to sample a light level signal during readout of another imaging pixel in the same column. Even still, different channels may be used to readout black level and light level signals of the same pixel during subsequent readouts of the imaging array.

The illustrated embodiment of column sampling circuits 202a-202x randomly selects sampling channels responsive to a random bit sequence. In particular, column sampling circuits 202a-202x each include an input RNDM_IN coupled to random input bus 220 to receive a random bit sequence generated by random bit sequence generator 204. In one embodiment random bit sequence generator 204 is a linear feedback shift register (LFSR). A LFSR is a shift register whose input bit is a linear function of its previous state. For example, the input bit of a LFSR may be the linear function exclusive-or (XOR) or the linear function exclusive-nor (XNOR) of some combination of bits of the overall shift register value. The stream of values produced by the LFSR is determined by its previous state and may eventually repeat because of the finite number of states possible in the shift register. However, an LFSR with a well-chosen feedback function may provide a sequence of bits which appears random and which has a very long cycle. Thus, in one embodiment, a "random" bit sequence may be a repeating sequence of bits which has a cycle long enough so as to appear random.

In one embodiment, random bit sequence generator 204 outputs a 1-bit random bit sequence. That is, the random bit sequence output onto random input bus 220 may be a single serial stream of random bits. In another embodiment, random bit sequence generator 204 outputs an n-bit random sequence where a plurality of random bit sequences are output in parallel onto random input bus 220.

After a column sampling circuit (e.g., 202a, 202b, etc.) samples the data signals from a column bitline, the sampled data signals need to be transferred to global gain stage 208 and analog to digital converter (ADC) 212. Since the channels on which the data signals were randomized by the column sampling circuits, readout circuitry 210 further includes global switching matrix 206 to switch the channels back to match the inputs of global gain stage 208. Thus, the randomization of channels may be transparent to global gain stage 208 and ADC. For example, global gain stage 208 may include a differential amplifier that includes a positive input for receiving the light level signal and a negative input for receiving the black level signal. In this example, global switching matrix 206 switches the channels back to ensure that whichever channel was used to sample the light level signal is coupled to the positive input of the differential amplifier and that which ever channel was used to sample the black level signal is coupled to the negative input of the differential amplifier 208.

Global switching matrix 206 switches the columns back to match the inputs of global gain stage 208 responsive to random bit(s) received from the column sampling circuits 202a-202x via a random output bus (i.e., RNDM_OUT BUS) 216. The random bit(s) received from the column sampling circuits 202a-202x may be generated by circuitry included in each column sampling circuit that store the random bit(s) received from random input bus 220. That is, column sampling circuits 202a-202x each may receive random bit(s) from random sequence generator 204, store the random bit(s), and then output the random bit(s) to global switching matrix 206. In one embodiment, random output bus 216 includes a single line for outputting a single stored bit per pixel readout. In another embodiment, random output bus 216 includes an n-number of lines for outputting multiple bits in parallel, dependent on the number of random bit sequences output by random sequence generator 204.

In the illustrated embodiment of FIG. 2, column sampling circuits 202a-202x each include an input HOLD_IN coupled to receive hold signals via the hold signal bus (i.e., HOLD SIGNAL BUS) 218. The input HOLD_IN and hold signal bus 218 may include a plurality of lines for transferring multiple hold signals. For example, hold signal bus 218 may include two or more lines for transmitting the hold signals (e.g., at least one line for transmitting a hold black signal and at least one line for transmitting a hold light signal). In one embodiment, the hold signals are generated by control circuitry 120 shown in FIG. 1A and are used to control the timing of the sampling of the various data signals of each pixel. A hold black signal may control the timing of sampling a black level signal, while a hold light signal may control the timing of sampling a light level signal. In one embodiment, column sampling circuits 202a-202x each include circuitry to selectively couple a hold signal to the randomly selected channels. In one embodiment, column sampling circuits selectively couple the hold signal to the appropriate channels responsive to the random bit(s) received from random bit sequence generator 204. For example, column sampling circuit 202a may couple a hold black signal to a channel that was randomly selected to sample the black level signal and column sampling circuit 202a may further couple a hold light level signal to a channel that was randomly selected to sample the light level signal.

Figure 3:
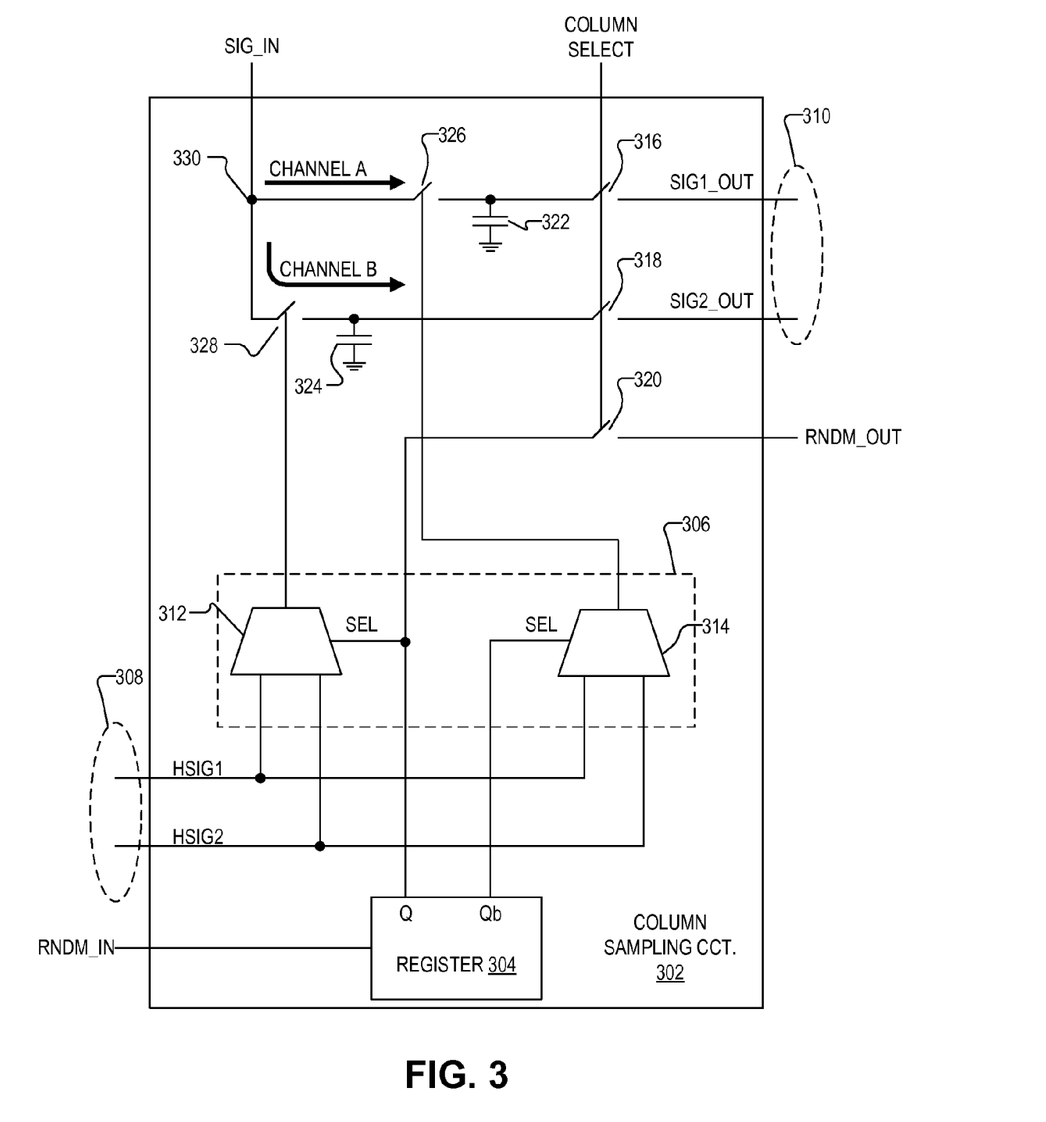
FIG. 3 is a functional block diagram illustrating a column sampling circuit, in accordance with an embodiment of the invention.

FIG. 3 is a functional block diagram illustrating a column sampling circuit 302, in accordance with an embodiment of the invention. Column sampling circuit 302 is one possible implementation of column sampling circuit 202 (e.g., 202a, 202b, etc.) of FIG. 2. The illustrated example of column sampling circuit 302 includes a register 304, a switching matrix 306, a hold signal input 308, a data signal output 310, column select switches 316, 318, and 320, sampling capacitors 322 and 324, and hold switches 326 and 328. Switching matrix 306 is illustrated as including multiplexers 312 and 314.

The illustrated embodiment of column sampling circuit 302 includes two sampling channels (i.e., channel A and channel B) for sampling data signals received from the input SIG_IN (i.e., a column bitline). Thus, data signal output 310 includes two lines (i.e., SIG1_OUT and SIG2_OUT) for outputting sampled data signals. In one embodiment, channel A includes all circuit components and conductors along the signal path between node 330 and output SIG1_OUT. For example, channel A may include hold switch 326, sampling capacitor 322, column select switch 316 and the conductors therebetween. In one embodiment channel A further includes any circuit components and conductors along the signal path between the output SIG1_OUT and the global switching matrix (e.g., global switching matrix 206 of FIG. 2). Similarly, in one embodiment, channel B includes all circuit components and conductors along the signal path between node 330 and output SIG2_OUT and in another embodiment may further include circuit components and conductors along the signal path between the output SIG2_OUT and the global switching matrix.

Hold signal input 308 is illustrated as including two lines (i.e., HSIG1 and HSIG2) for inputting hold signals. In one embodiment HSIG1 is coupled to receive hold black signals and HSIG 2 is coupled to receive hold light signals generated by control circuitry 120 of FIG. 1A. As shown in FIG. 3, multiplexer 314 is coupled to selectively connect hold signals to hold switch 326 of channel A, while multiplexer 312 is coupled to selectively connect hold signals to hold switch 328 of channel B.

As shown in FIG. 3, the Q and Qb outputs of register 304 are coupled to the SEL inputs of multiplexers 312 and 314, respectively. Register 304 is configured to store a random bit received from the input RNDM_IN and to provide outputs Q and Qb to the SEL inputs of switching matrix 306. In one embodiment, the random bit received by register 304 is a random bit generated by random sequence generator 204 of FIG. 2. In one embodiment, the Qb output of register 304 is the inverse of the Q output. Thus, in this embodiment, if multiplexer 314 is selected to couple hold signal HSIG1 to hold switch 326, then multiplexer 312 will be selected to couple the other hold signal (i.e., HSIG2) to hold switch 328 and vice versa.

Figure 4:
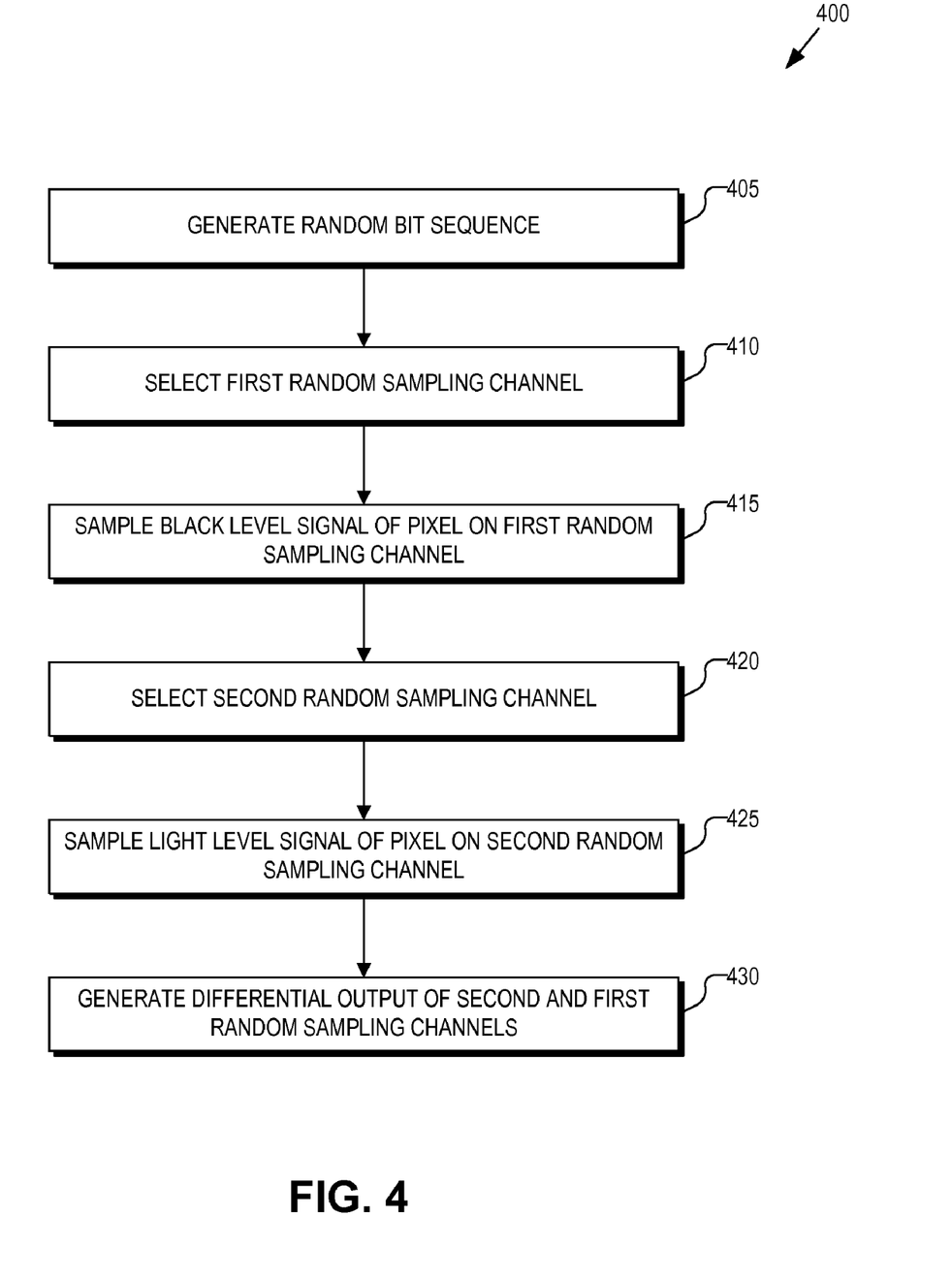
FIG. 4 is a flow chart illustrating a process for sampling pixels of an imaging pixel, in accordance with an embodiment of the invention.

FIG. 4 is a flow chart illustrating a process 400 for sampling pixels of an imaging pixel, in accordance with an embodiment of the invention. Process 400 will be described with reference to FIGS. 2, 3 and 4. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 405 random sequence generator 204 generates a random bit sequence. In one embodiment, the random bit sequence is a 1-bit serial stream of random bits. One of the random bits of the random bit sequence are received by a column sampling circuit (e.g., column sampling circuit 302 of FIG. 3) and stored in register 304. Register 304 then outputs the random bit on output Q and it's inverse on output Qb. In a process block 410 a first random sampling channel is selected based on the outputs of register 304. For example, assuming that hold signal HSIG1 is the hold black signal then multiplexer 314 may couple HSIG1 to hold switch 326 of channel A or alternatively multiplexer 312 may couple HSIG1 to hold switch 328 of channel B depending on the random bit stored in register 304.

Once the first sampling channel is selected the black level signal of a pixel is sampled in a process block 415. That is, the hold black signal may enable one of the hold switches (i.e., 326 or 328) to allow the black level signal received from a column bitline to charge a respective sampling capacitor (i.e., 322 or 324).

In a process block 420 a second random sampling channel is selected based on the outputs of register 304. In the embodiment of FIG. 3, since there are only two channels, the channel other than the one used to sample the black level signal is now selected to sample the light level signal. For example, assuming that channel A was selected to sample the black level signal, then channel B may now be selected to sample the light level signal. The hold light signal is then coupled to enable one of the hold switches (i.e., 326 or 328) to allow the light level signal received from the column bitline to charge a respective sampling capacitor (i.e., 322 or 324).

After both the black level signal and the light level signal have been sampled, the data signals will next need to be transferred to global gain stage 208 and ADC 212. The column sampling circuit 302 receives a column select signal to enable column select switches 316, 318, and 320. Since the channels were randomized, column sampling circuit 302 includes an output RNDM_OUT to provide global switching matrix 206 with information about which channels were used to sample which data signals. In the illustrated embodiment, the output RNDM_OUT is coupled to the Q output of register 304 when column select switch 320 is enabled. Global switching matrix 206 then switches the data signals back to match the appropriate inputs of global gain stage 208. For example, global gain stage 208 may include a differential amplifier that has a negative input for receiving the black level signals and a positive input for receiving the light level signals. Global switching matrix 206 receives the random bit(s) from column sampling circuit 302 and then connects the appropriate channel to the matching input of the differential amplifier. In other words, the black level signal of a pixel may always be directed to the negative input of the differential amplifier, while the light level signal of the pixel may always be directed to the positive input of the differential amplifier. Thus, the randomization of channel order may be transparent to global gain stage 208. In a process block 430 global gain stage 208 generates a differential output of the second (e.g., light level signal) and first (e.g., black level signal) randomly selected sampling channels.

Without randomization of sampling channels, black and light level signals are sampled by respective fixed channels. For example, black level signals would always be sampled by channel A, and light level signals would always be sampled by channel B. The magnitude of the signal at the negative input of the differential amplifier 208 is black level signal plus A, where A is the background level generated by all circuit components and conductors along channel A from node 330, capacitor 322, output SIG1_OUT of FIG. 3, to the differential amplifier 208. Similarly, the magnitude of the signal at the positive input of the differential amplifier 208 is light level signal plus B, where B is the background level generated by all circuit components and conductors along channel B from node 330, capacitor 324, output SIG2_OUT of FIG. 3, to the differential amplifier 208. Thus, the differential output of global gain stage 208 for pixels in a particular column without randomization of sampling channels would be:

$$\text{differential output} = \text{light level signal} - \text{black level signal} + \text{channel offset} \quad \text{EQ 1}$$

where the channel offset is (B−A), which is mainly caused by component mismatches during fabrication and/or due to the physical placement of the components in each channel. Without channel randomization, this channel offset, also known as column fixed pattern noise (FPN), may appear as vertical lines in the resultant image produced by an image sensor.

However, in accordance with embodiments of the present invention that include sampling channel randomization, black and light level signals are randomly sampled by sampling channels within a column sampling circuit. For example, when Q=1, the black level signal is sampled by channel A (i.e., black level signal plus A) and the light level signal is sampled by channel B (i.e., light level signal plus B). The global switching matrix 206 may always direct the light level signal to the positive input of the differential amplifier 208, and the black level signal to the negative input of the differential amplifier 208. Thus the differential output will be light level signal minus the black level signal plus (B minus A). When Q=0, the black level signal is sampled by channel B (i.e., black level signal plus B) and the light level signal is sampled by channel A (i.e., light level signal plus A). Since the global switching matrix 206 may always direct the light level signal to the positive input of the differential amplifier 208, and the black level signal to the negative input of the differential amplifier 208, the differential output will be the light level signal minus the black level signal minus (B minus A). Thus, the differential output of global gain stage 208 for pixels in a particular column will be:

$$\text{differential output} = \text{light level signal} - \text{black level signal} + \text{channel offset when } Q=1;$$

and $$\text{differential output} = \text{light level signal} - \text{black level signal} - \text{channel offset when } Q=0; \quad \text{EQ. 2}$$

where channel offset is (B minus A). Accordingly, there are two differential background levels: (B minus A), and negative (B minus A), which are distributed randomly with a zero mean. Thus, the channel offset is still present in EQ. 2, but since the sampling channels are randomized the effects of the channel offset on the resultant image are harder for the human eye to detect. That is, a visible solid vertical line caused by the channel offset of a particular column becomes a less visible vertical line of random dots having two levels embedded in the image due to the randomization of the sampling channels.

In one embodiment, the black and light level signal of an pixel are randomly sampled by at least two sampling channels in a particular column sampling circuit. All pixels that belong to a particular column of a 2D imaging sensor are sampled by the same column sampling circuit. There is no cross-column interconnects. Furthermore, there is no correlation between the random sampling of pixels in a row and another row. In other words, the black and light level signal sampling is random in a column as well as in a row.

Referring now back to FIG. 2, analog to digital converter (ADC) 212 then receives the differential output from global gain stage 208 and generates a digital output. In one embodiment, the digital output of ADC 212 is provided to function logic 115 of FIG. 1A to be stored or manipulated by applying post image effects (e.g., crop, rotate, remove red eye, adjust brightness, adjust contrast, or otherwise).

Process 400 explained above is described in terms of computer software and hardware. The techniques described may constitute machine-executable instructions embodied within a machine (e.g., computer) readable medium, that when executed by a machine will cause the machine to perform the operations described. Additionally, process 400 may be embodied within hardware, such as an application specific integrated circuit ("ASIC") or the like.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

Figure 5:
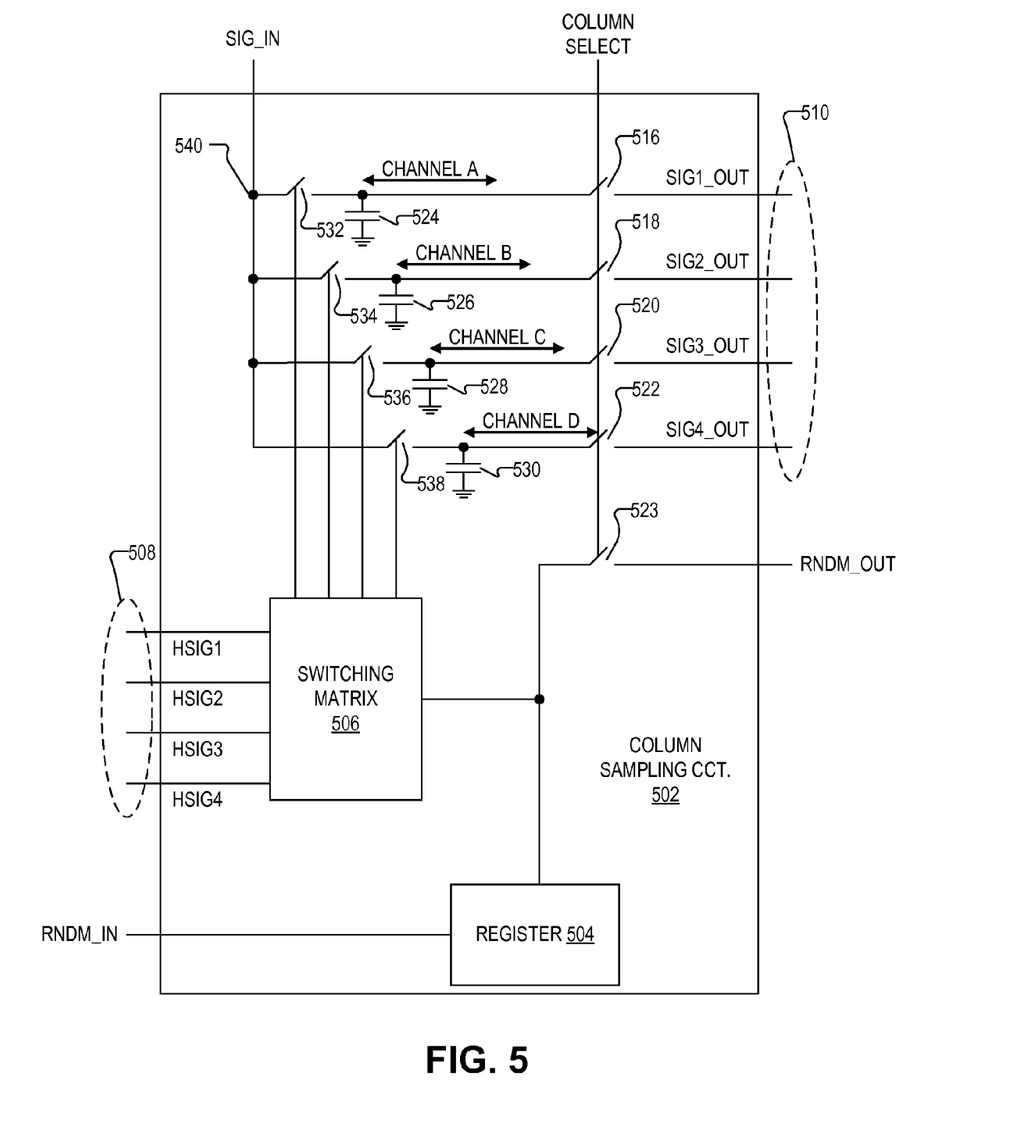
FIG. 5 is a functional block diagram illustrating a column sampling circuit, in accordance with an embodiment of the invention.

FIG. 5 is a functional block diagram illustrating a column sampling circuit 502, in accordance with an embodiment of the invention. Column sampling circuit 502 is one possible implementation of randomized sampling circuit 202 (e.g., 202a, 202b, etc.) of FIG. 2. The illustrated example of column sampling circuit 502 includes a register 504, a switching matrix 506, column select switches 516, 518, 520, 522, and 523, sampling capacitors 524, 526, 528, and 530, and hold switches 532, 534, 536, and 538.

The illustrated embodiment of column sampling circuit 502 includes four channels (i.e., channel A, channel B, channel C, and channel D) for sampling data signals received from the input SIG_IN (i.e., a column bitline). Thus, data signal output 510 includes four lines (i.e., SIG1_OUT, SIG2_OUT, SIG3_OUT, and SIG4_OUT) for outputting sampled data signals. In one embodiment, each channel includes all circuit components and conductors along its respective signal path between node 540 and its output (e.g., SIG1_OUT, etc). For example, channel A may include hold switch 532, sampling capacitor 524, column select switch 516 and the conductors therebetween. In one embodiment each channel further includes any circuit components and conductors along the signal path between their output (e.g., SIG1_OUT) and the global switching matrix (e.g., global switching matrix 206 of FIG. 2). Although FIG. 5 illustrates column sampling circuit 502 as including four channels, sampling circuit 502 may include any number of sampling channels including 2 or more.

Hold signal input 508 is illustrated as including four lines (i.e., HSIG1, HSIG2, HSIG3, and HSIG4) for inputting hold signals. In one embodiment, switching matrix 506 is coupled to connect hold signals HSIG1, HSIG2, HSIG3, and HSIG4 to hold switches 532, 534, 536, and 538, respectively. For example, HSIG1 and HSIG3 are coupled to receive hold black signals such that SIG1_OUT will be black level signal plus A and SIG3_OUT will be black level signal plus C, where A and C are background noise generated in channels A and C, respectively. HSIG 2 and HSIG4 are coupled to receive hold light signals such that SIG2_OUT will be light level signal plus B and SIG4_OUT will be black level signal plus D, where B and D are background noise generated in channels B and D, respectively.

As shown in FIG. 5, the output of register 504 is coupled to selectively control switching matrix 506. Register 504 is configured to store random bits received from the input RND-M_IN and to selectively control the switching of switching matrix 506. In one embodiment, the random bits received by register 504 are random bits generated by random sequence generator 204 of FIG. 2. For example, the column sampling circuit is coupled to randomly select a first sampling channel from among four of sampling channels to sample the black level signal. Then the column sampling circuit is further coupled to randomly select a second sampling channel from among the available three channels to sample the light level signal.

Depending on the random bits received, for example, switching matrix 506 may then be coupled to connect hold signals HSIG1, HSIG2, HSIG3, and HSIG4 to hold switches 534, 532, 538, and 536, respectively. For example, HSIG2 and HSIG4 would now be coupled to receive hold black signals, thus SIG2_OUT will be black level signal plus B and SIG4_OUT will be black level signal plus D, and HSIG1 and HSIG3 are coupled to receive hold light signals, thus SIG1_OUT will be light level signal plus A and SIG3_OUT will be light level signal plus C. Furthermore, depending on the random status assigned, the differential output from the differential amplifier 208 for pixels in a particular column will be:

$$\text{differential output} = \text{light level signal} - \text{black level signal} + (A\text{-}B);$$

Or $$\text{differential output} = \text{light level signal} - \text{black level signal} - (A\text{-}B);$$

Or $$\text{differential output} = \text{light level signal} - \text{black level signal} + (C\text{-}D);$$

Or $$\text{differential output} = \text{light level signal} - \text{black level signal} - (C\text{-}D); \quad \text{EQ. 3}$$

where (A-B) can be considered a first channel offset and (C-D) is a second channel offset in a particular column. Therefore there are four differential background levels: (A-B), -(A-B), (C-D), and -(C-D), which are distributed randomly with a zero mean. In this way, a visible solid vertical line caused by a fixed differential background level or the channel offset of a particular column becomes a less visible vertical line of random dots having four levels embedded in the image due to the randomization of the sampling channels. It should be appreciated that the possible combinations are not limited by EQ. 3, for example, differential background levels of ±(A-C), ±(A-D), ±(B-C), ±(B-D) can also be generated by the switching matrix 506.

Figure 6:
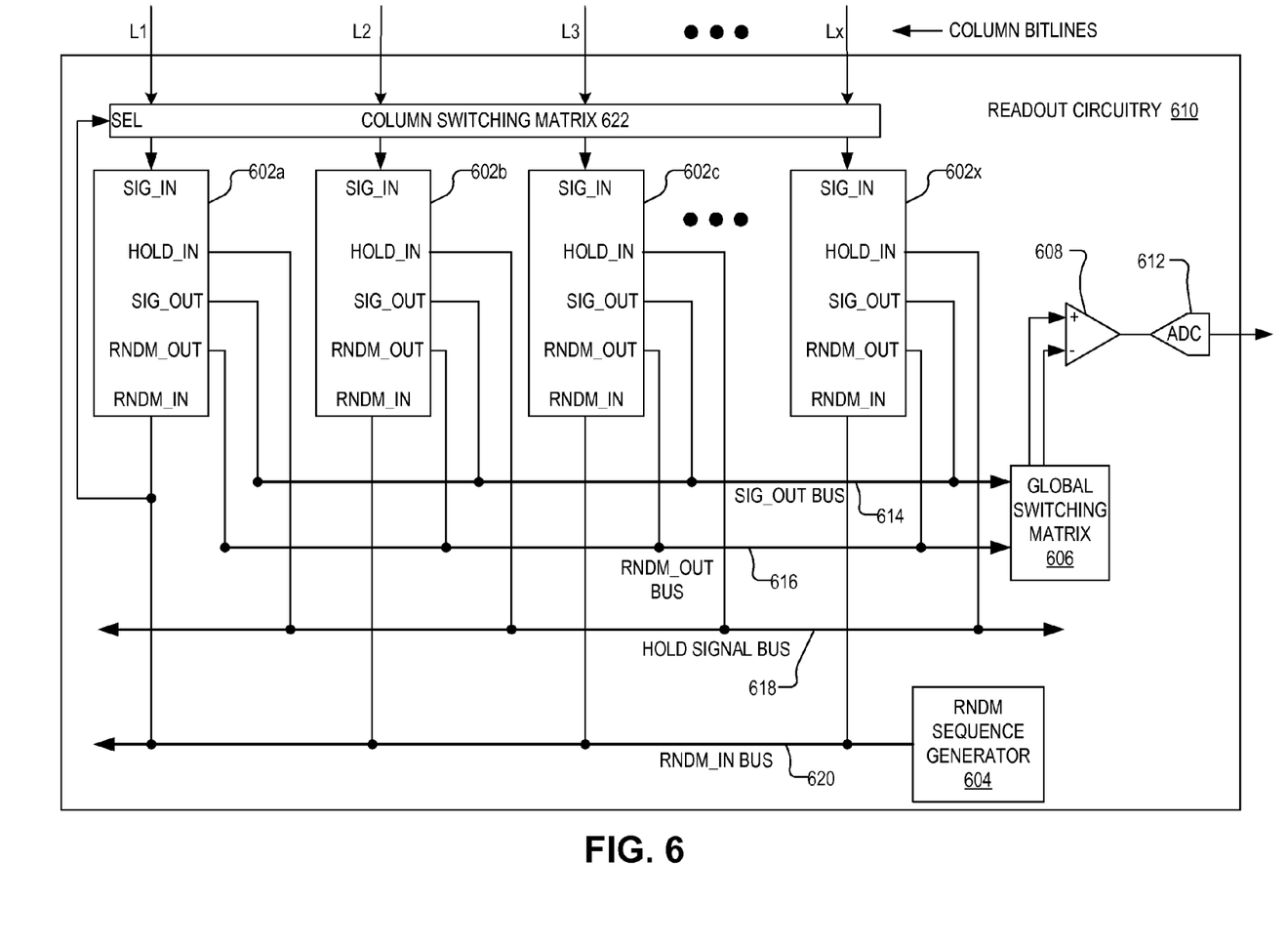
FIG. 6 is a functional block diagram illustrating readout circuitry of an imaging sensor with channel randomization, in accordance with an embodiment of the invention.

FIG. 6 is a functional block diagram illustrating readout circuitry 610 of an imaging sensor with channel randomization, in accordance with an embodiment of the invention. Readout circuitry 610 is one possible implementation of readout circuitry 110 of FIG. 1A. The illustrated embodiment of readout circuitry 610 includes column sampling circuits 602a-602x, a random bit sequence generator 604, a global switching matrix 606, a global gain stage 608, an analog-to-digital converter (ADC) 612, a signal output bus 614, a random output bus 616, a hold signal bus 618, a random input bus 620, and a column switching matrix 622.

The operation of readout circuitry 610 is similar to that of readout circuitry 210 of FIG. 2, discussed above. However, readout circuitry 610 includes column switching matrix 622 coupled between the column bitlines and the column sampling circuits to randomize the coupling of the column bitlines to the column sampling circuits. In particular, column switching matrix 622 receives random bit(s) via the RNDM_IN BUS and couples a particular column bitline to a column sampling circuit (e.g., 602a, 602b, etc.) responsive to the random bit(s). For example, column sampling circuit 602b may be selected to sample the data signals during readout of a particular imaging pixel coupled to column bitline L3, while the column sampling circuit 602b may be selected to sample the data signals during readout of another imaging pixel in a different column. This random cross-column interconnects combined with the sampling channel randomization provided by each column sampling circuit (e.g., 602a, 602b, etc.) obfuscates the effects of column fixed pattern noise even further and may result in an even more appealing image to the human eye.

Figure 7:
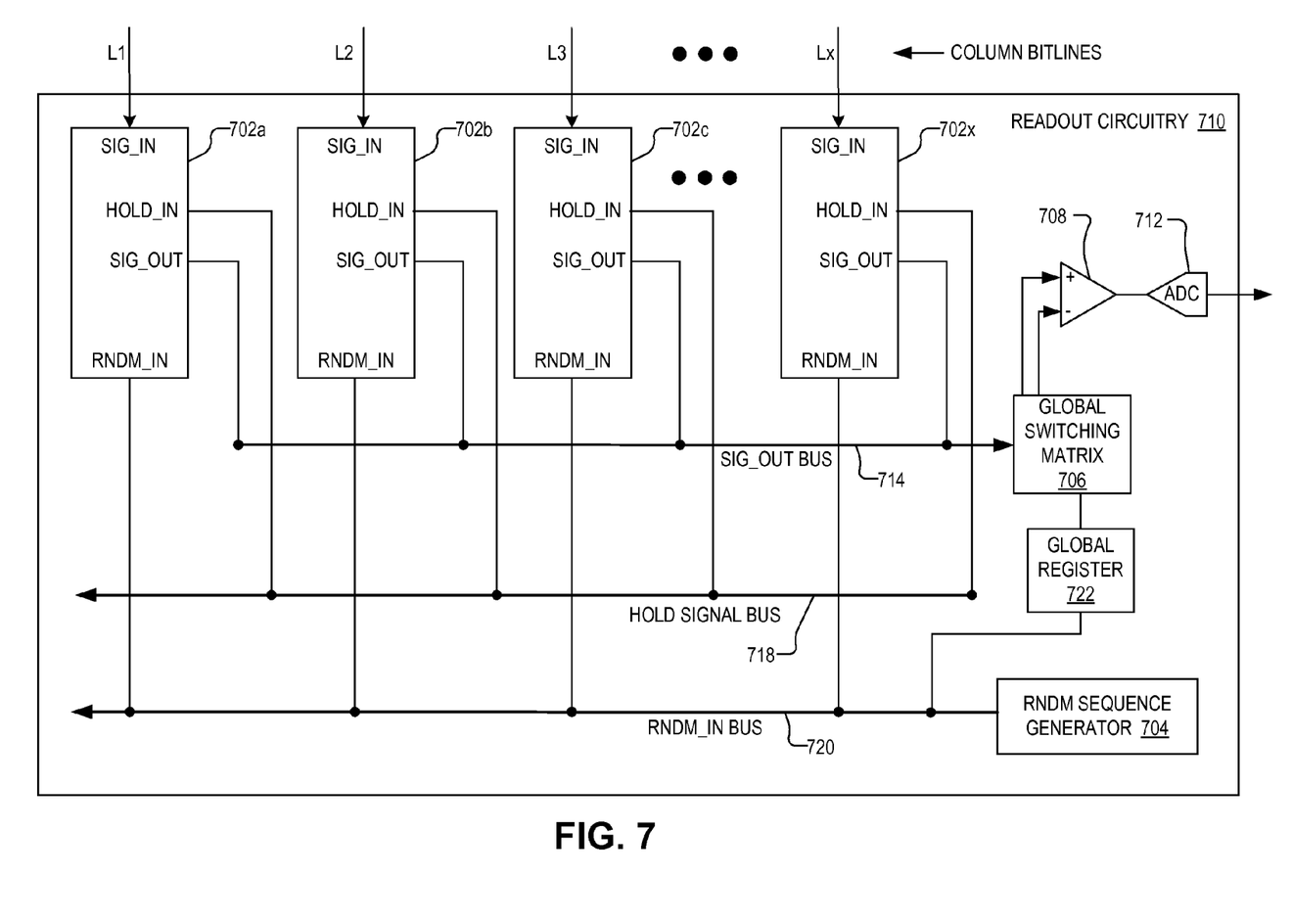
FIG. 7 is a functional block diagram illustrating readout circuitry of an imaging sensor with channel randomization, in accordance with an embodiment of the invention.

FIG. 7 is a functional block diagram illustrating readout circuitry 710 of an imaging sensor with sampling channel randomization, in accordance with an embodiment of the invention. Readout circuitry 710 is one possible implementation of readout circuitry 110 of FIG. 1A. The illustrated embodiment of readout circuitry 710 includes column sampling circuits 702a-702x, a random bit sequence generator 704, a global switching matrix 706, a global gain stage 708, an analog-to-digital converter (ADC) 712, a signal output bus 714, a hold signal bus 718, a random input bus 720, and a global register 722.

The operation of readout circuitry 710 is similar to that of readout circuitry 210 of FIG. 2, discussed above. However, readout circuitry 710 includes global register 722 coupled between random sequence generator 704 and global switching matrix to store the random bit(s) generated by random sequence generator 704. Global register 722 further provides an output to global switching matrix 706 that indicates which of the sampling channels is selected to sample the black level signals and which of the sampling channels is selected to sample the light level signals.

Thus, in one embodiment, each of the column sampling circuits (702a, 702b, etc.) do not include their own register for storing the random bit(s). Instead, global register 722 may store the random bit(s) for the entire readout circuitry 710. Furthermore, in one embodiment, readout circuitry 710 does not include a RNDM_OUT BUS for transferring random bit(s) from the column readout circuitry to the global switching matrix 706. Instead, global switching matrix 706 receives information about which channels were used to sample the data signals via the random sequence generator 704, either directly or via the RNDM_IN BUS 720.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging sensor, comprising:
a plurality of imaging pixels arranged in a column;
a column sampling circuit coupled to the column;
a plurality of sampling channels included in the column sampling circuit, wherein the column sampling circuit randomly selects a first sampling channel from among the plurality of sampling channels to sample a first data signal from a pixel included in the plurality of imaging pixels and wherein the column sampling circuit randomly selects a second sampling channel from among the plurality of sampling channels to sample a second data signal from the pixel; and
a random bit sequence generator coupled to provide a random bit sequence to the column sampling circuit, wherein the column sampling circuit is coupled to randomly select the sampling channels from among the plurality of sampling channels responsive to the random bit sequence,
wherein the column sampling circuit further includes a register to store at least a portion of the random bit sequence and to provide an output representative of which of the plurality of sampling channels are selected to sample the first and second data signal.

2. The imaging sensor of claim 1, wherein the first data signal is a black level signal and wherein the second data signal is a light level signal.

3. The imaging sensor of claim 1, wherein the column sampling circuit further comprises a switching matrix coupled to the plurality of sampling channels to couple a first hold signal to the first randomly selected sampling channel and to coupled a second hold signal to the second randomly selected sampling channel responsive to a random bit sequence.

4. The imaging sensor of claim 1, wherein each of the plurality of sampling channels includes a sampling capacitor.

5. The imaging sensor of claim 1, further comprising:
an amplifier having a first input to receive the first data signal and a second input to receive the second data signal; and
a global switching matrix coupled between the plurality of sampling channels and the amplifier, wherein the switching matrix is coupled to selectively couple the first randomly selected sampling channel to the first input of the amplifier and the second randomly selected sampling channel to the second input of the amplifier.

6. A complementary metal-oxide-semiconductor (CMOS) imaging sensor, comprising:
an array of imaging pixels arranged in a plurality of columns and rows;
a plurality of column sampling circuits coupled to the respective columns of the array to sample black level signals and light level signals from the plurality of imaging pixels, wherein each column sampling circuit includes a plurality of sampling channels, wherein each of the plurality of column sampling circuits randomly selects at least two sampling channels from among the plurality of sampling channels to sample the black level signals and the light level signals; and
a random bit sequence generator coupled to provide a random bit sequence to the column sampling circuits, wherein each column sampling circuit randomly selects the at least two sampling channels from among the plurality of sampling channels responsive to the random bit sequence.

7. The CMOS imaging sensor of claim 6, wherein each column sampling circuit further comprises a switching matrix coupled to the plurality of sampling channels to selectively couple a hold black signal to one of the two randomly-selected sampling channels responsive to the random bit sequence and to selectively couple a hold light signal to the other of the two randomly-selected sampling channels responsive to the random bit sequence.

8. The CMOS imaging sensor of claim 6, further comprising:
an amplifier including:
a first differential input to receive the black level signals; and
a second differential input to receive the light level signals; and
a global switching matrix coupled between the plurality of sampling channels and the differential inputs of the amplifier to selectively couple the randomly selected two sampling channels to the differential inputs of the amplifier responsive to the random bit sequence such that the black level signals are coupled to the first differential input and the light level signals are coupled to the second differential input.

9. The CMOS imaging sensor of claim 8, further comprising a global register coupled between the random bit sequence generator and the global switching matrix to store at least a portion of the random bit sequence and to provide a output representative of which of the plurality of sampling channels is selected to sample the black level signals and which of the plurality of sampling channels is selected to sample the light level signals.

10. The CMOS imaging sensor of claim 6, further comprising a column switching matrix coupled between the columns and the column sampling circuits to randomize the coupling of the columns to the column sampling circuits responsive to the random bit sequence.

11. An imaging sensor, comprising:
a plurality of imaging pixels arranged in a plurality of columns, each imaging pixel is to produce a black level signal when the pixel is reset and a light level signal when the pixel is exposed to light during image acquisition;
a plurality of column sampling circuits each coupled to a respective one of the plurality of columns, wherein each of the column sampling circuits includes a plurality of sampling channels coupled to their respective column, wherein the column sampling circuit randomly selects a first sampling channel from among the plurality of sampling channels to sample the black level signal of the pixel and a second sampling channel from among the plurality of channels to sample the light level signal of the pixel;
a global switching matrix; and
a differential amplifier having a negative input and a positive input, wherein the first selected sampling channel that samples the black level signal is coupled by the global switching matrix to the negative input of the differential amplifier and the second selected sampling channel that samples the light level signal is coupled by the global switching matrix to the positive input of the differential amplifier.

12. The imaging sensor of claim 11, further comprising a column switching matrix coupled between the columns and the column sampling circuits to randomize the coupling of the columns to the column sampling circuits.

13. A method for reducing column fixed pattern noise implementable in an image sensor, comprising:
providing a light level signal of a pixel in a column of the image sensor wherein the light level signal is produced by the pixel when the pixel is exposed to light in an image acquisition,
providing a black level signal of the pixel wherein the black level signal is produced by the pixel when the pixel is reset;
providing an offset of a column sampling circuit coupled to the column wherein the offset is characterized by the column sampling circuit;
randomizing the sign of the offset; and
providing a readout of a pixel in the column including the randomized offset such that the readout of a pixel in the column is randomly one of (light level signal−black level signal+offset) and (light level signal−black level signal−offset).

* * * * *